Figure 1:
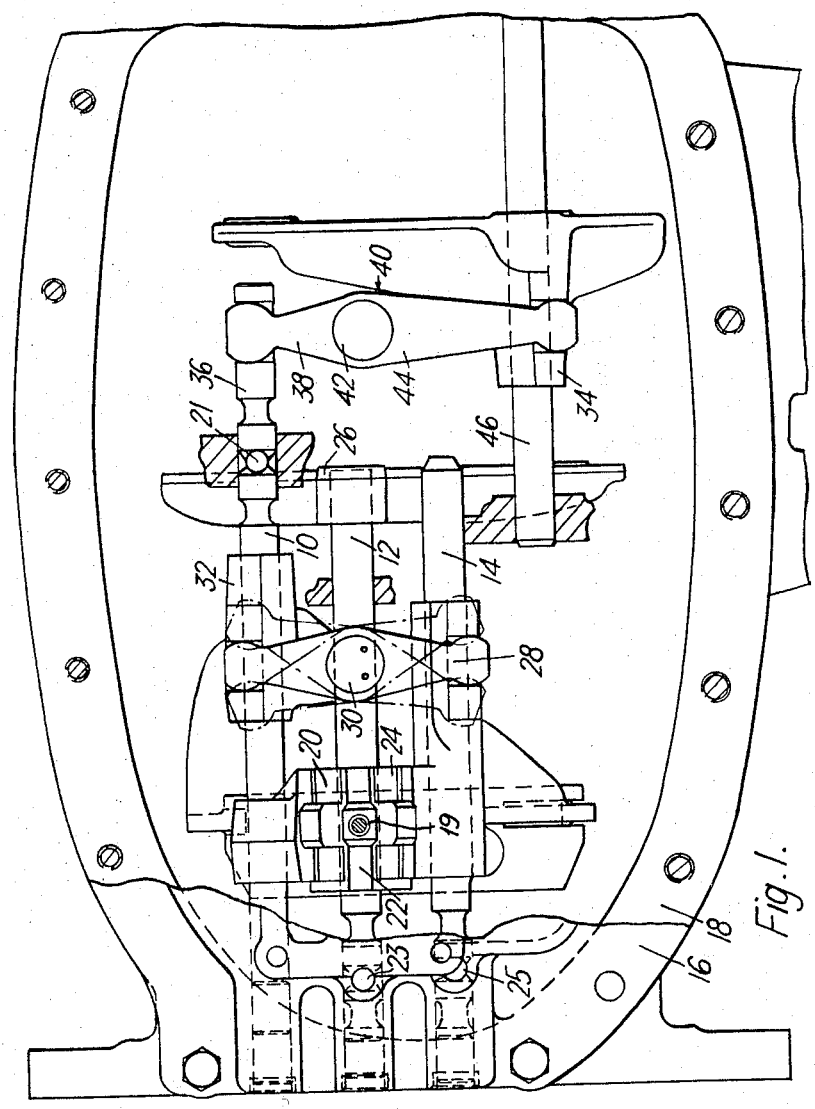

March 28, 1967 T. C. F. STOTT 3,310,992
MOTOR VEHICLE GEAR SELECTOR MECHANISMS
Filed June 15, 1964 2 Sheets-Sheet 2
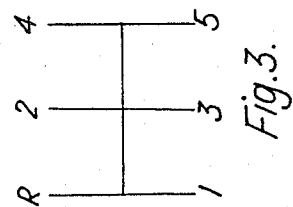
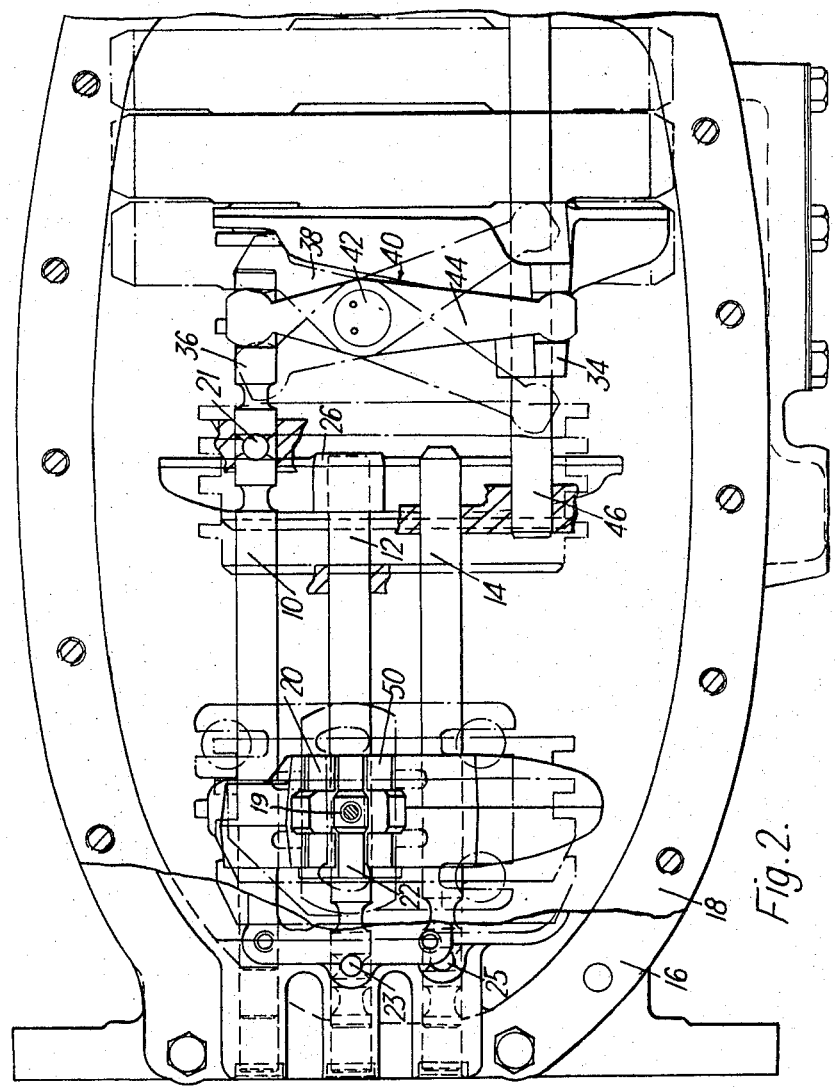
Inventor
Thomas Charles Felix Stott
BY
*a. M. Heiter*
Attorney United States Patent Office 3,310,992
Patented Mar. 28, 1967

3,310,992
MOTOR VEHICLE GEAR SELECTOR
MECHANISMS
Thomas Charles Felix Stott, Harpenden, England, assignor to General Motors Corporation, Detroit, Mich., a corporation of Delaware
Filed June 15, 1964, Ser. No. 374,965
Claims priority, application Great Britain, June 20, 1963, 24,539/63
5 Claims. (Cl. 74—473)

This invention relates to motor vehicle gear selector mechanisms in which, for engagement or disengagement of a gear ratio, gearshift level movement is transmitted by way of a selector shaft to any selected one of a plurality of actuator abutments, for example selector jaws or lugs, to cause sliding of a corresponding one of a plurality of striker forks.

In such gear selector mechanisms each actuator abutment may be directly connected to or integral with its striker fork, the striker forks being freely slidable along striker fork rods or rails. Alternatively, each actuator abutment and also its striker fork may be fixedly mounted on a striker fork rod or rail, the striker fork rods or rails themselves being freely slidable relative to the vehicle gearbox.

In a motor vehicle gear selector mechanism according to the invention, gearshaft lever movement for engagement or disengagement of a gear ratio is transmitted by way of a selector shaft to any selected one of a plurality of actuator abutments, for example selector jaws or lugs, to cause sliding of a corresponding one of a plurality of striker forks, one of the actuator abutments for a pair of forward gear ratios, preferably the two highest forward gear ratios, being connected to its striker fork by way of a reversing link, for example a lever pivotally mounted intermediate its ends, whereby movement of the actuator abutment in one direction causes its striker fork to move in the opposite direction.

From another aspect the present invention is a motor vehicle gear selector mechanism for a stepped-ratio gearbox the gear train of which would inherently result in an unconventional shift pattern, in which a reversing link is connected in the selector mechanism between a selector jaw and striker fork for the two highest gear ratios and gives for the selector mechanism and gearbox together a conventional overall shift pattern at the gearshift lever.

The striker fork which is movable in the opposite direction to the direction of movement of its actuator abutment may, if desired, be freely mounted on one of the other striker fork rods or rails, whereby a compact construction is possible. For example, three striker fork rods may be disposed side by side with a reversing lever disposed transversely above them for movement about a vertical pivot axis intermediate its ends, one end of the reversing lever being pivotally connected to a jaw on one of the lateral striker fork rods and the other end of the lever being pivotally connected to a striker fork which is slidable along the other lateral striker fork rod.

The gear selector mechanism according to the invention is primarily intended for use in conjunction with a motor vehicle 5-speed gearbox which is to be available in a direct-drive version in which the 5th-speed ratio is in direct drive, and alternatively in an overdrive version in which the 4th- and 5th-speed gear positions are interchanged such that the 4th-speed ratio is direct drive and the 5th-speed ratio is an overdrive ratio obtained by the use of an overdrive gear on the layshaft of the gearbox. In the ordinary way these two versions of the gearbox would have different shift patterns for gearshift lever movement through the gears, for example if the direct drive version were designed to have a conventional shift pattern the overdrive version would have the 4th- and 5th-speed positions in the shift pattern interchanged because of the interchange of the 4th- and 5th-speed gear positions necessary in the overdrive version of the gearbox. Both versions can be produced with the conventionally shaft pattern, however, namely one in which each gear-change between adjacent forward-speed ratios is effected by a straight-through movement of the gearshift lever, if the overdrive version includes, in accordance with the invention, a reversing lever or other reversing link between the 4th and 5th-speed actuator abutment and the 4th- and 5th-speed striker fork.

The scope of the invention is defined by the appended claims; specific illustrative embodiments and their operation are hereinafter particularly described with reference to the accompanying drawings, in which:

FIGURE 1 is a plan of a preferred embodiment of a gear selector mechanism according to the invention for use with a 5-speed gearbox (that is, a gearbox which gives 5 forward speed ratios and a reverse ratio) in which the 4th-speed ratio is a direct-drive ratio and the 5th-speed ratio is an overdrive ratio;

FIGURE 2 is a plan of a gear selector mechanism which is similar to that shown in FIGURE 1 but, according to the invention, is for use with a 5-speed gearbox in which the 4th-speed ratio is a reduction ratio and the 5th-speed ratio is a direct-drive ratio; and FIGURE 3 shows a common shift pattern for gear lever movement for controlling both the gear selector mechanism shown in FIGURE 1 and that shown in FIGURE 2.

In the preferred embodiment of the gear selector mechanism according to the invention, as shown in FIGURE 1, three striker fork rods 10, 12 and 14 are mounted side by side beneath a cover plate 16 for a gearbox 18. Each of the rods is axially slidable by movement of a selector jaw near one of its ends, the three jaws 20, 22 and 24 respectively being aligned at right-angles to the axes of the rods. Resiliently biased ball detents 21, 23 and 25 for the respective striker fork rods 10, 12 and 14 provide positive location for each of the rods in any one of three axial positions. A conventional selector lever 19 is mounted for a universal movement on the cover plate 16, such as shown and described in the U.S. Patent 1,944,331, to E. A. Thompson, and, as shown in FIGURE 1 of the drawings of this invention, the lever 19 has an end portion which may be positioned in any of the jaws 20, 22 and 24 by appropriate lateral rotation of the upper end of the lever. Subsequent rotation of the lever in a direction generally perpendicular to the jaw selection movement will move the selected jaw and attached rod axially. For example, the selected jaw and rod will be moved axially in one direction as the vehicle operator pivots the upper portion of the lever forwardly and in an opposite direction as the lever is pivoted rearwardly. The middle striker fork rod 12 has a striker fork 26 connected to it: this striker fork co-operates in the conventional manner with an annular groove in a second and third speed clutch sleeve (not shown) in the gearbox, whereby axial movement of the second and third speed striker fork rod jaw 22 by the selector arm causes axial movement of the clutch sleeve for clutching the second or third speed gear to the gearbox mainshaft, or disconnecting it from the mainshaft.

The jaw of one of the lateral striker fork rods, namely the jaw 24 of the rod 14, is pivotally connected to one arm of a reversing link in the form of a lever 28 which is disposed transversely above the three striker fork rods 10, 12 and 14 and is pivoted midway between its ends about a vertical pivot pin 30 which is disposed substantially above the longitudinal axis of the middle striker fork rod 12. The other end of the reversing lever 28 is pivotally connected to a fourth and fifth speed striker fork 32 which is freely mounted on the other lateral striker fork rod 10. The construction is therefore such that axial movement in one direction imparted by the selector lever to the fourth and fifth speed jaw 24 causes the fourth and fifth speed striker fork 32 to slide in the opposite direction along the striker fork rod 10. This axial movement of the fourth and fifth speed striker fork is used in the conventional manner to move a fourth and fifth speed clutch sleeve (not shown) in the gearbox to clutch the fourth or fifth speed gear to the gearbox mainshaft, or to disconnect it from the mainshaft.

The striker fork rod 10 along which the fourth and fifth speed striker fork 32 is slidable also serves to transmit ratio selecting movement of the selector lever 19 by way of the jaw 20 to a reverse and first speed striker fork 34. For this purpose a portion 36 at the end of the striker fork rod 10 remote from the reverse and first speed jaw 20 is pivotally connected to the shorter arm 38 of a two-arm lever 40. This lever 40 extends horizontally substantially at right-angles to the axis of the striker fork rod 10 and is pivoted about a vertical pivot pin 42, the end portion of the longer arm 44 of this lever being pivotally connected to the reverse and first speed striker fork 34, which is slidable along a separate striker fork rail 46. The result of this construction is that movement of the reverse and first speed jaw 20 by the selector arm in one direction causes the reverse and first speed striker fork 34 to slide along its rail 46 in the other direction. This movement of the reverse and first speed striker fork is used to cause a gear (not shown) which is splined in conventional manner to the mainshaft of the gearbox to slide into or out of engagement with a layshaft gear giving first speed, or into or out of engagement with a reverse idler gear.

By way of comparison with this gear selector mechanism according to the invention, which as stated is for use with an overdrive version of a five-speed gearbox, FIGURE 2 shows a gear selector mechanism for use with the direct drive version of the five-speed gearbox, like reference numerals being used for like parts. The fourth and fifth speed jaw 24, the reversing lever 28 and its pivot pin 30, and the fourth and fifth speed striker fork 32 of the mechanism shown in FIGURE 1 are in the mechanism shown in FIGURE 2 replaced by an integral fourth and fifth speed striker fork and jaw 50 which is fixed to the axially slidable striker fork rod 14. Thus in the mechanism shown in FIGURE 2 the fourth and fifth speed fork and jaw must move in the same direction, in contrast to the mechanism shown in FIGURE 1, in which the fourth and fifth speed striker fork 32 is slidable along the first and reverse speed striker fork rod 10 through the intermediary of the reversing lever 28 in the opposite direction to the fourth and fifth speed jaw 24. With the exception of this minor modification the gear selector mechanisms are the same, thus giving economy in production due to the rationalization of the design of the two versions. The advantage to the vehicle driver is that both gear selector mechanisms give the same shift pattern, so that correct operation is obtained by using the same sequence of shifts irrespective of whether the vehicle is fitted with the direct drive version of the gearbox or the overdrive version. FIGURE 3 shows the common shift pattern for both versions of the gearbox.

Of course, if desired, the gear selector mechanism including the reverse lever pivoted midway between its ends could be used in the direct drive version of the gearbox, the overdrive version having the fourth and fifth speed striker fork connected directly to the fourth and fifth speed jaw.

I claim:

1. A motor vehicle gear selector mechanism comprising a gear shift lever, a plurality of slidably mounted actuator abutments, said lever being movable to select any one of said actuator abutments and being subsequently movable to effect sliding movement of any selected actuator abutment, a plurality of slidably mounted striker members for effecting sliding movement of corresponding ratio-engagement members in a stepped-ratio gearbox, a reversing link constituting an interconnection between one of said actuator abutments and one of the striker members for a pair of forward gear ratios such that sliding movement of said last mentioned actuator abutment in one direction causes sliding movement of the cooperating striker member in the opposite direction, and a second reversing link constituting an interconnection between another of said actuator abutments and another of said striker members for another pair of ratios, said last-mentioned striker member responding to movement of said last-mentioned actuator abutment in one direction by sliding in an opposite direction.

2. In a control for a multi-speed transmission, a support, a plurality of elongated rods logitudinally movable with respect to said support, a jaw fixed to each of said rods, a striker fork fixed to one of said rods, a second striker fork slidably mounted on another of said rods, a lever, means pivoting said lever to said support, said lever having one end operatively connected to one of said jaws and the other end operatively connected to said slidable striker fork, a second lever pivoted to said support, one end of said second lever being coupled to said rod on which said striker fork is longitudinally movable, a rail fixed in said support, a striker fork slidably mounted with respect to said rail, said second-mentioned lever having an end portion thereof connected to said last-mentioned striker fork, said control providing an orderly shift pattern established by serially operating said elongated rods.

3. In a control for a multi-ratio transmission, a support, a plurality of axially movable members mounted in said support, movable means for selectively moving each of said members axially, first lever means movable in response to axial movement of one of said members for controlling a first pair of ratios of the transmission and a second lever means movable in response to axial movement of another of said members for controlling a second pair of ratios of the transmission.

4. The control defined in claim 3 and further including ratio engaging means slidably mounted on one of said movable members, said ratio engaging means being operatively connected with one end of said first lever means, a fixed rail in said support, additional ratio-engaging means slidably mounted on said fixed rail and operatively engaged with one end of said second lever means.

5. In a control for a multi-speed transmission, a support, a plurality of rods longitudinally movable with respect to said support, a jaw fixed to each of said rods, movable means selectively engageable with each of said jaws for selectively shifting said rods longitudinally, slide means axially movable on one of said rods, a lever pivotally mounted to said support and having an end portion operatively coupled to said slide member, said lever having another end operatively connected to one of said jaws, a second lever pivoted to said support having one end coupled to said last-mentioned rod, a rail fixed in said support, ratio shifting means slidably mounted on said rail, said second lever having an end portion connected to said ratio changing means and another end portion operatively connected with one of said elongated slidable rods, said control providing a predetermined shift pattern and stepped ratio change effected by sequentially shifting each of said rods in an identical manner.

References Cited by the Examiner
UNITED STATES PATENTS

| | | | |
|---|---|---|---|
| 2,017,101 | 10/1935 | Lapsley | 74—473 |
| 2,029,178 | 1/1936 | Manville | 74—473 |
| 2,055,770 | 9/1936 | Manville | 74—473 |
| 2,310,310 | 2/1943 | Peterson et al. | 74—473 X |

FRED C. MATTERN, JR., *Primary Examiner.*

MILTON KAUFMAN, *Examiner.*

J. D. PUFFER, *Assistant Examiner.*